United States Patent
Wippler

(10) Patent No.: US 9,908,472 B2
(45) Date of Patent: Mar. 6, 2018

(54) HEADS UP DISPLAY FOR SIDE MIRROR DISPLAY

(71) Applicant: Toyota Motor Engineering & Manufacturing North America, Inc., Erlanger, KY (US)

(72) Inventor: Erik Anthony Wippler, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 250 days.

(21) Appl. No.: 14/826,544

(22) Filed: Aug. 14, 2015

(65) Prior Publication Data
US 2017/0043719 A1    Feb. 16, 2017

(51) Int. Cl.
   *B60R 1/00*     (2006.01)
   *H04N 5/232*    (2006.01)
   *H04N 7/18*     (2006.01)
   *G02B 27/01*    (2006.01)
   *H04N 5/247*    (2006.01)

(52) U.S. Cl.
CPC ............ *B60R 1/00* (2013.01); *G02B 27/0101* (2013.01); *H04N 7/181* (2013.01); *B60R 2300/205* (2013.01); *B60R 2300/8046* (2013.01); *G02B 2027/0138* (2013.01)

(58) Field of Classification Search
CPC ................ B60R 1/00; B60R 2300/205; B60R 2300/8046; G02B 2027/0138; G02B 27/0101; H04N 7/181
See application file for complete search history.

(56) References Cited

U.S. PATENT DOCUMENTS

| | | | |
|---|---|---|---|
| 4,998,784 A | 3/1991 | Freeman et al. | |
| 5,289,321 A | 2/1994 | Secor | |
| 5,414,439 A | 5/1995 | Groves et al. | |
| 6,078,355 A * | 6/2000 | Zengel | B60R 1/00 348/148 |
| 6,424,273 B1 * | 7/2002 | Gutta | B60R 1/00 340/435 |
| 6,498,620 B2 * | 12/2002 | Schofield | B60N 2/002 348/118 |
| 6,954,152 B1 | 10/2005 | Matthews | |
| 7,423,521 B2 | 9/2008 | Kukita et al. | |
| 7,520,616 B2 | 4/2009 | Ooba et al. | |
| 8,593,520 B2 * | 11/2013 | Hong | H04N 7/181 348/143 |
| 2002/0113876 A1 | 8/2002 | Kim | |
| 2010/0066833 A1 | 3/2010 | Ohshima et al. | |
| 2011/0149077 A1 | 6/2011 | Robert | |

(Continued)

*Primary Examiner* — Francis G Geroleo
(74) *Attorney, Agent, or Firm* — Dinsmore & Shohl LLP

(57) ABSTRACT

A vehicle side viewing system that can replace side view mirrors of the vehicle and provide improved vehicle aerodynamics. The vehicle side viewing system can be part of a vehicle that has a driver's side and a passenger's side as is known to those skilled in the art. The vehicle side viewing system has a driver's side view camera and a passenger's side view camera. The vehicle side viewing system also has a driver's side heads up display (HUD) and a passenger's side HUD. The driver's side HUD is operable to display a camera view from the DSV camera and the passenger's side HUD is operable to display a camera view from the PSV camera.

14 Claims, 4 Drawing Sheets

(56) References Cited

U.S. PATENT DOCUMENTS

| | | | |
|---|---|---|---|
| 2012/0062741 A1* | 3/2012 | Stimel, Jr. | B60R 1/00 |
| | | | 348/148 |
| 2012/0224060 A1 | 9/2012 | Gurevich et al. | |
| 2012/0320205 A1* | 12/2012 | Hong | H04N 7/181 |
| | | | 348/148 |
| 2013/0155236 A1 | 6/2013 | Ramdeo | |
| 2016/0137129 A1* | 5/2016 | Mawhinney | B60R 1/006 |
| | | | 348/148 |
| 2016/0209647 A1* | 7/2016 | Fursich | G02B 27/0093 |

* cited by examiner

HEADS UP DISPLAY FOR SIDE MIRROR DISPLAY

FIELD OF THE INVENTION

The instant application is directed to a vehicle with a heads up display, and in particular to a vehicle that uses side view cameras and a heads up display to replace side mirrors of the vehicle and thereby improve aerodynamics thereof.

BACKGROUND OF THE INVENTION

The use of side mirrors, sometimes referred to as side view mirrors and/or side view mirrors, on motor vehicles is known. Such mirrors provide an occupant of the vehicle with a view of a side rearward of the vehicle and thus allow for one to know if it is safe to change lanes when driving down a highway, safe to back the vehicle up, and the like.

Such side mirrors are typically contained within a side mirror frame which extends from an exterior surface of the vehicle. In addition, the side mirror frame subjects the vehicle to additional wind drag while the vehicle is traveling along a highway when compared to the same vehicle without such side mirror frames. However, it is appreciated that such side mirrors are necessary for the vehicle and can be required by law. Therefore, a side viewing system that replaces side view mirrors on a vehicle and reduces wind drag would be desirable.

SUMMARY OF THE INVENTION

A vehicle side viewing system that can replace side view mirrors of the vehicle and result in improved vehicle aerodynamics is provided. The vehicle side viewing system can be part of a vehicle that has a driver's side and a passenger's side as is known to those skilled in the art. The vehicle side viewing system has a driver's side view (DSV) camera and a passenger's side view (PSV) camera. The vehicle side viewing system also has a driver's side heads up display (HUD) and a passenger's side HUD. The driver's side HUD is operable to display a camera view from the DSV camera and the passenger's side HUD is operable to display a camera view from the PSV camera. The DSV camera and the PSV camera can replace a DSV mirror and a PSV mirror, respectively. In addition, the DSV camera and PSV camera have a reduced wind drag profile compared to a DSV mirror and PSV mirror, respectively. In this manner, the motor vehicle has improved aerodynamics compared to the same vehicle that does have the DSV and PSV mirrors.

In some instances, the driver's side HUD is located on a driver's side window of the vehicle and the passenger's side HUD is located on a passenger's side window. In addition, the driver's side HUD can be located at a front lower area of the driver's side window, e.g. on the driver's side window. Likewise, the passenger's side HUD can be located at a front lower portion of the passenger's side window, e.g. on the passenger's side window.

The vehicle can include a DSV camera control that is operable for an occupant of the vehicle to remotely move and/or rotate the DSV camera in a manner similar to a side mirror control that moves and/or rotates a side view mirror as is known to those skilled in the art. As such, the camera view along with an image displayed on the driver's side HUD can be changed. The vehicle can also include a PSV control to remotely move and/or rotate the PSV camera in a manner similar to a PSV side mirror control. Optionally, the DSV and/or PSV camera control can also expand or contract a camera view angle of the DSR and/or PSV camera, respectively, zoom the image of the DSR and/or PSV camera, respectively, and the like. As such, the camera view along with an image displayed on the driver's side and/or passenger's side HUD can be changed.

In some instances, a separate driver's side HUD window or surface is present and located for the driver's side HUD to be displayed thereon. The driver's side HUD window or surface can have a lowered position and a raised position. As such, the driver's side HUD window can be in a lowered position when the driver's side window is in a raised position and a raised position when the driver's side window is in a lowered position. In the alternative, the driver's side HUD window can be configured to be permanently positioned in the raised position and thus be in such position when the driver's side window is in the lowered position or the raised position. It is appreciated that a passenger's side HUD window with a similar configuration as the driver's side HUD window can be provided.

The DSV camera and the PSV camera can be relatively small in size compared to side view mirrors or side view mirror frames and have a reduced wind drag profile compared to side view mirrors or side view mirror frames when the vehicle is traveling down a road. In some instances, the DSV camera and/or PSV camera is at least partially embedded within an exterior surface of the driver's side and passenger's side, respectively. In the alternative, the DSV camera and/or PSV camera can be attached to a support that extends from the exterior surface of the driver's side and passenger's side, respectively.

DETAILED DESCRIPTION OF THE INVENTION

Figure 1:
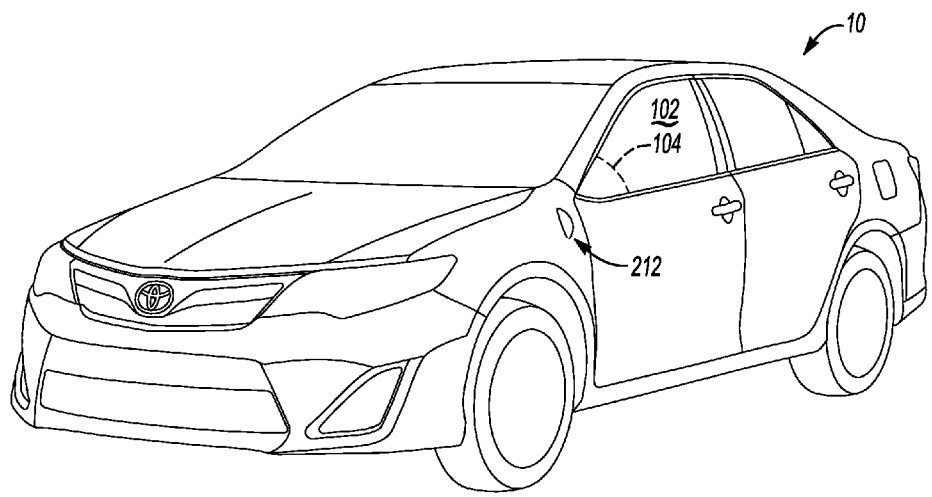
FIG. 1 is a schematic illustration of a vehicle having a side viewing system with a driver's side camera according to an aspect disclosed herein.

A vehicle side viewing system that uses side view cameras instead of side view mirrors is provided. The use of the side view cameras affords for a reduced wind drag profile for the vehicle and thus improved vehicle aerodynamics. The side view cameras operate in conjunction with heads up displays such that camera views are displayed for an occupant of the vehicle. As such, what an occupant typically sees with a side view mirror is captured with a side view camera and displayed within the vehicle on a heads up display.

The vehicle can have a driver's side view (DSV) camera and a passenger's side view (PSV) camera. The DSV camera is located on a driver's side of the vehicle and in a location that provides a similar side view proximate to the vehicle as would a driver's side view mirror. Similarly, the PSV camera is located on the vehicle such that a passenger's side view is captured and similar to what would be seen by an occupant from the passenger's side view mirror.

The cameras, such as video cameras, provide a video feed or video signal to a head up display (HUD). The HUD can include a video processor to which a video camera provides the video feed or video signal as is known to those skilled in the art. The video processor then provides a video processed signal to an image source which in turn projects a display onto a mirror which further projects an image onto a surface within the vehicle. Also, the displayed image creates a virtual image for viewing by an occupant in the vehicle.

In some instances, the displayed image is located in a region or area of the vehicle where an occupant would typically look to a side view mirror in order to obtain a view of a side and rear region of the vehicle as is known to those skilled in the art. As such, a driver's side HUD can be located on a driver's side window and a passenger's side HUD can be located on a passenger's side window. Furthermore, the driver's side HUD can be located on a front lower portion of the driver's side window and the passenger's side HUD can be located on a front lower portion of the passenger's side window.

In other instances, the vehicle can have a separate driver's side HUD window or surface that is present and located for the driver's side HUD to be displayed thereon when the driver's side window is in a lowered position. Likewise, the vehicle can have a passenger's side HUD window or surface that is present and located for the passenger's side HUD to be displayed thereon when the passenger's side window is in a lowered position. The given HUD window or surface can be placed in a raised position when the respective side window is in a lowered position and placed in a lowered position when the respective window is in a raised position. In the alternative, the given HUD window or surface can be in a permanent raised position such that it is used irrespective of whether the respective side window is in the raised or lowered position. In the alternative, the given HUD window or surface can be in a permanent raised position.

Figure 2:
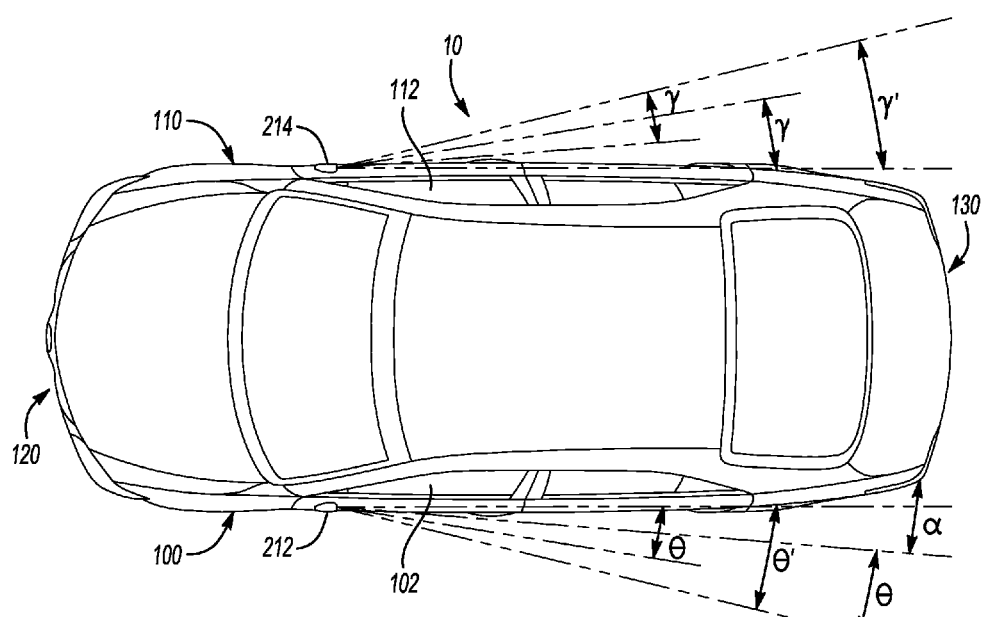
FIG. 2 is a top view of the vehicle shown in FIG. 1 with the vehicle having a side viewing system with the driver's side camera shown in FIG. 1 and a passenger's side camera according to an aspect disclosed herein.

Turning now to FIGS. 1 and 2, a vehicle with a side viewing system is shown generally at reference numeral 10. The vehicle 10 has a driver's side 100 and a passenger's side 110 as is known to those skilled in the art. The vehicle also has a front end 120 and a rear end 130. As shown in FIG. 1, a DSV camera and/or DSV camera profile 212 extending from an exterior surface of the driver's side of the vehicle is shown. In addition, a driver's side front window 102 having a front lower portion 104 is also shown. The size of the front lower portion or area 104 can range from an area of 25 square centimeter ($cm^2$) to an area of 650 $cm^2$, preferably range from an area of 55 $cm^2$ to 400 $cm^2$, and more preferably range from an area of 100 $cm^2$ to 200 $cm^2$.

FIG. 2 provides a schematic illustration of a PSV camera and/or PSV camera profile 214 along with a passenger's front window 112. The DSV camera 212 can have a viewing angle theta ($\theta$) that can be changed for example by an angle alpha ($\alpha$) as illustrated in FIG. 2. In addition, the viewing angle can be increased to $\theta'$ as also shown in the figure.

The PSV camera can similarly have a viewing angle gamma ($\gamma$) which can be moved inwardly and outwardly from the passenger's side 110 of the vehicle, and/or expanded to an angle $\gamma'$. Controls to change or move the angle of viewing for the DSV camera 212 and/or PSV camera 214 are discussed below. It is appreciated that the DSV camera 212 and/or PSV camera 214 have a viewing angle looking in a rearward direction, i.e. in a direction from the front end 120 to the rear end 130 of the vehicle. The view angle $\theta$ and/or $\gamma$ can be between 30-90° and alternatively between 30-60°. In addition, the movement or rotation angle $\alpha$ can be up to 15°, alternatively up to 30°, or still yet up to 45°.

Figure 3:
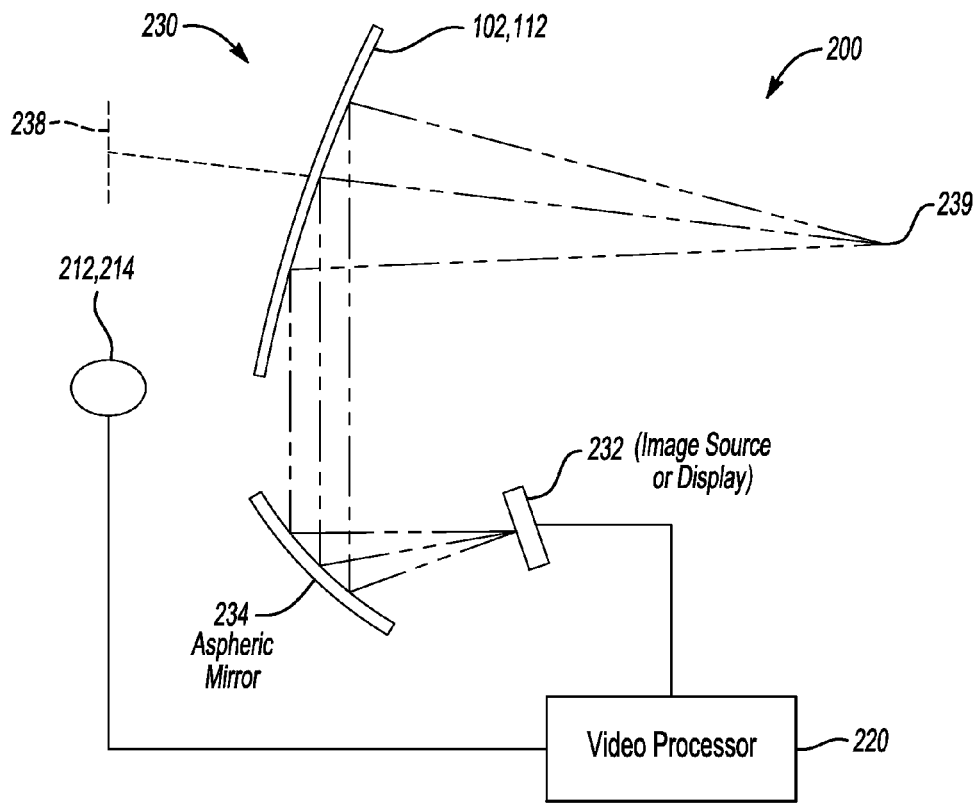
FIG. 3 is a schematic illustration of a heads up display system according to an aspect disclosed herein.

FIG. 3 provides a schematic illustration of a heads up display (HUD) system at reference numeral 200. The HUD system 200 can include the DSV camera 212 and/or PSV camera 214 which is/are in electronic communication with a video processor 220. The video processor receives a video image input from the DSV camera 212 and/or PSV camera 214 and processes such signal and transmits said signal to an image source 232. An aspheric mirror 234 reflects a displayed image provided by the image source 232 onto the driver's side window 102 or passenger's side window 112. The displayed image on the side window provides a virtual image 238 for viewing by an occupant viewing the side window from location 239. It is appreciated that the angles shown for the reflection of the displayed image at mirror 234, side window 102, 112, virtual image 232 and viewing location 239 are for illustrative purposes only.

Figure 4:
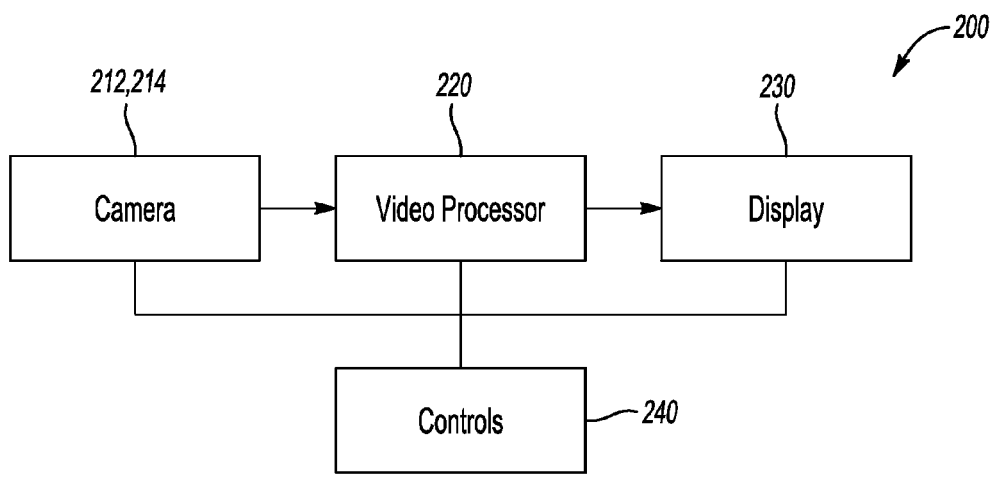
FIG. 4 is a schematic illustration of a heads up display with camera controls according to an aspect disclosed herein.

FIG. 4 provides an illustration of the HUD system 200 with the addition of controls 240 which can be used to move or rotate the DSV camera 212 and/or PSV camera 214, respectively, such that a video capture of the camera(s) and thus an image displayed on side window(s) 102,112 can be changed.

Figure 5:
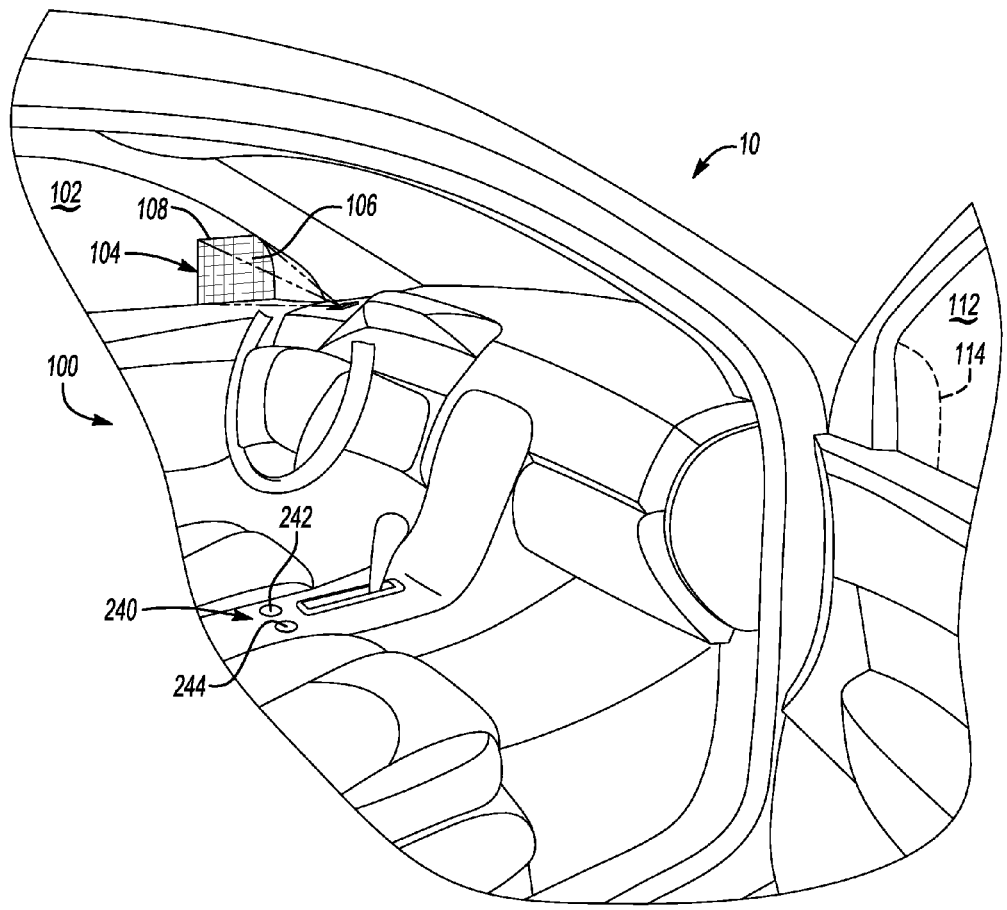
FIG. 5 is a perspective view of an interior of the vehicle shown in FIGS. 1 and 2 illustrating a heads up display on a passenger's side of the vehicle according to an aspect disclosed herein.

With reference to FIG. 5, a perspective view of an interior of the vehicle 10 with a view from the passenger's side 110 towards the driver's side 100 is shown. The passenger's side 110 has the passenger's side window 102 with a HUD image shown schematically at reference numeral 106. The HUD image 106 is located in the front lower portion 104 of the window 102. Optionally, a separate HUD window or surface 108 can be provided for the HUD image to be displayed thereon. In addition, the HUD window or surface 108 can be in a raised position as shown in the figure when the side window 102 is in the down or lowered position and/or when the side window 102 is in the raised position. Furthermore, the HUD window or surface 108 can itself be raised and/or lowered such that it is not present when the side window 102 is in the raised or up position but is present when the window 102 is in the down or lowered position. FIG. 5 also provides an illustration of the front lower portion 114 where an occupant would look to see an HUD image, and previously would have looked to see a side view mirror, on the passenger's side window 112.

Figure 6:
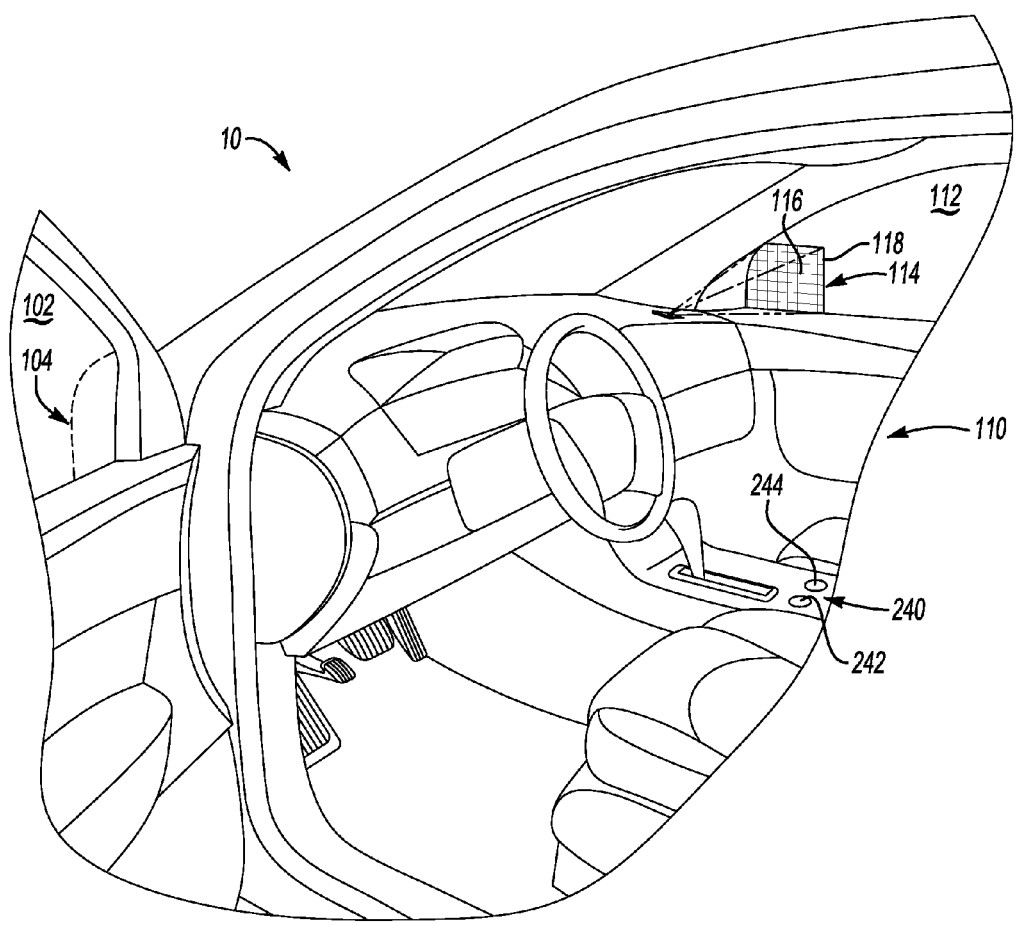
FIG. 6 is a perspective view of an interior of the vehicle shown in FIGS. 1 and 2 illustrating a heads up display on a passenger's side of the vehicle according to an aspect disclosed herein.

FIG. 6 provides a perspective view of the interior of the vehicle 10 with a view from the driver's side 100 towards the passenger's side 110. FIG. 6 also illustrates an HUD image 118 projected onto the passenger's side window 112 at the front lower portion 114. In addition, an HUD window or surface 118 can be present and used in a similar fashion as the HUD window 108 described in FIG. 5.

Both FIGS. 5 and 6 show controls 240 with a DSV camera control 242 and a PSV camera control 244. It is appreciated that an occupant of the vehicle 10 can use the control 242 and/or 244 to move or rotate the DSV camera 212 or PSV camera 214, respectively, as in a similar fashion that such controls are used to move or rotate rear side view mirrors. Stated differently, the controls 242, 244 can be operable to function as side view mirror controls used with current vehicle side view mirror systems. In addition, the controls 240 can change the viewing angle, e,g, from θ to θ', zoom the viewing angle, etc. In this manner, the video image captured by a given side view camera can be changed, moved, etc. by an occupant of the vehicle.

It is appreciated that the use of the DSV camera 212 and/or PSV camera 214 can result in a reduction or elimination of blind spots typically known to be present through the use of side view mirrors. In addition, the DSV camera 212 and/or PSV camera 214 can be relatively small in size, e.g. having an approximate diameter of 1 inch or less, and thus require much less space and volume compared to a side view mirror. Therefore, the DSV camera 212 and/or PSV camera 214 require a much lower and reduced profile extending from the exterior surface of the vehicle, which in turn provides improved aerodynamics due to reduced wind drag. In this manner, a vehicle that has improved aerodynamics compared to a similar vehicle using rear side view mirrors is provided.

The examples, aspects, embodiments, and the like discussed above are for illustrative purposes only and thus are not meant and should not be interpreted to limit the scope of the instant disclosure. Changes, modifications, etc. will occur to those skilled in the art and yet still fall within the scope of the instant disclosure. As such, it is the claims, and all equivalents thereof, that define the scope of the invention.

I claim:

1. A vehicle side viewing system comprising:
    a motor vehicle having a driver's side with a driver's side window and a passenger side with a passenger's side window;
    a driver's side view (DSV) camera and a passenger's side view (PSV) camera;
    a driver's side head up display (HUD) and a passenger's side HUD;
    a driver's side HUD window being present and located for said driver's side HUD to be displayed on when said driver's side window is in a lowered position, wherein said driver's side HUD window is in a lowered position when said driver's side window is in a raised position and said driver's side HUD window is in a raised position when said driver's side window is in a lowered position;
    said driver's side HUD operable to display a camera view from said DSV camera and said passenger's side HUD operable to display a camera view from said PSV camera;
    said DSV camera and said PSV camera replacing a DSV mirror and a PSV mirror, respectively, on said motor vehicle and resulting in said motor vehicle having improved aerodynamics compared to said motor vehicle having said DSV mirror and said PSV mirror.

2. The vehicle side viewing system of claim 1, wherein said driver's side HUD is located on said driver's side window when said driver's side window is in said raised position and on said driver's side HUD window when said driver's side window is in said lowered position, and said passenger's side HUD is located on said passenger's side window.

3. The vehicle side viewing system of claim 2, wherein said driver's side HUD is located on a front lower portion of said driver's side window when said driver's side window is in said raised position and said passenger's side HUD is located on a front lower portion of said passenger's side window.

4. The vehicle side viewing system of claim 3, wherein said DSV camera has a DSV control operable for an occupant of said motor vehicle to change a viewing angle of said DSV camera and said camera view displayed on said driver's side HUD.

5. The vehicle side viewing system of claim 4, wherein said PSV camera has a PSV control operable for said occupant of said motor vehicle to change a viewing angle of said PSV camera and said camera view displayed on said passenger's side HUD.

6. The vehicle side viewing system of claim 1, further comprising a passenger's side HUD window being present and located for said passenger's side HUD to be displayed on when said passenger's side window is in a lowered position.

7. The vehicle side viewing system of claim 6, wherein said passenger's side HUD window is in a lowered position when said passenger's side window is in a raised position and said passenger's side HUD window is in a raised position when said passenger's side window is in a lowered position.

8. The vehicle side viewing system of claim 7, wherein said passenger's side HUD is in a raised position when said passenger's side window is in a lowered position and a raised position.

9. A vehicle side viewing system with side view cameras instead of side view mirrors, said vehicle comprising:
    a motor vehicle having a driver's side with a driver's side window and a passenger side with a passenger's side window;
    a driver's side view (DSV) camera located on an exterior surface of said driver's side and a passenger's side view (PSV) camera located on an exterior surface of said passenger's side;
    a DSV camera control operable for an occupant of said motor vehicle to change a viewing angle of said DSV camera;
    a PSV camera control operable for the occupant of said motor vehicle to change a viewing angle of said PSV camera;
    a driver's side head up display (HUD) located on said driver's side and a passenger's side HUD located on said passenger's side;
    a driver's side HUD window being present and located for said driver's side HUD to be displayed on when said driver's side window is in a lowered position, wherein said driver's side HUD window is in a lowered position when said driver's side window is in a raised position and said driver's side HUD window is in a raised position when said driver's side window is in a lowered position;
    said driver's side HUD operable to display a camera view from said DSV camera at a front lower portion of a driver's side window and said passenger's side HUD operable to display a camera view from said PSV camera at a front lower portion of a passenger's side window;
    said DSV camera and said PSV camera replacing a DSV mirror and a PSV mirror, respectively, on said motor vehicle and resulting in said motor vehicle having improved aerodynamics compared to said motor vehicle having said DSV mirror and said PSV mirror.

10. The vehicle side viewing system of claim 9, wherein said DSV camera is embedded within said exterior surface of said driver's side.

11. The vehicle side viewing system of claim 10, wherein said PSV camera is embedded within said exterior surface of said passenger's side.

12. The vehicle side viewing system of claim 9, further comprising a passenger's side HUD window being present and located for said passenger's side HUD to be displayed on when said passenger's side window is in a lowered position.

13. The vehicle side viewing system of claim 12, wherein said passenger's side HUD window is in a lowered position when said passenger's side window is in a raised position and said passenger's side HUD window is in a raised position when said passenger's side window is in a lowered position.

14. The vehicle side viewing system of claim 12, wherein said passenger's side HUD is in a raised position when said passenger's side window is in a lowered position and a raised position.

* * * * *